United States Patent [19]

Cowan

[11] Patent Number: 5,207,831
[45] Date of Patent: May 4, 1993

[54] CEMENT FLUID LOSS REDUCTION

[75] Inventor: Kenneth M. Cowan, Sugarland, Tex.

[73] Assignee: Shell Oil Company, Houston, Tex.

[21] Appl. No.: 825,732

[22] Filed: Jan. 27, 1992

Related U.S. Application Data

[63] Continuation of Ser. No. 614,048, Nov. 9, 1990, abandoned, which is a continuation of Ser. No. 363,233, Jun. 8, 1989, abandoned.

[51] Int. Cl.$^5$ .............................................. C04B 24/02
[52] U.S. Cl. ............................ 106/724; 166/292; 166/295
[58] Field of Search ............... 106/724, 726; 166/292, 166/295; 523/130

[56]  References Cited

U.S. PATENT DOCUMENTS

| | | | |
|---|---|---|---|
| 2,673,810 | 3/1954 | Ludwig | 106/93 |
| 2,705,050 | 3/1955 | Davis | 166/31 |
| 2,776,713 | 1/1957 | Morgan et al. | 166/22 |
| 2,800,963 | 7/1957 | Roberts et al. | 166/22 |
| 2,806,531 | 9/1957 | Morgan et al. | 166/29 |
| 2,822,873 | 2/1958 | Harmsen et al. | 166/29 |
| 2,852,402 | 9/1958 | Shell | 106/93 |
| 2,880,096 | 3/1959 | Hurley | 106/31 |
| 2,890,169 | 6/1959 | Prokop | 252/8.5 |
| 2,961,044 | 11/1960 | Shell | 166/21 |
| 3,022,824 | 2/1962 | Binkley et al. | 166/31 |
| 3,105,047 | 9/1963 | Miller et al. | 252/8.55 |
| 3,126,958 | 3/1964 | Bearden et al. | 166/29 |
| 3,132,693 | 5/1964 | Weisend | 166/33 |
| 3,145,774 | 8/1964 | Patchen | 166/31 |
| 3,168,139 | 2/1965 | Kennedy et al. | 166/29 |
| 3,180,748 | 4/1965 | Holmgren et al. | 106/104 |
| 3,232,777 | 2/1966 | Bush | 106/90 |
| 3,242,986 | 3/1966 | Hower | 166/31 |
| 3,306,354 | 2/1967 | O'Brien | 166/29 |
| 3,307,588 | 3/1967 | Hylak | 138/97 |
| 3,317,327 | 5/1967 | Matsuda et al. | 106/90 |
| 3,368,624 | 2/1968 | Heuer et al. | 166/29 |
| 3,379,260 | 4/1968 | O'Brien | 166/9 |
| 3,393,738 | 7/1968 | Bernard et al. | 166/29 |
| 3,409,093 | 11/1968 | Cunningham et al. | 175/65 |
| 3,499,491 | 3/1970 | Wyant et al. | 166/292 |
| 3,557,876 | 1/1971 | Tragesser | 166/292 |
| 3,605,898 | 9/1971 | Harrison et al. | 166/293 |
| 3,615,784 | 10/1971 | Cattanach | 106/88 |
| 3,616,858 | 11/1971 | Raza | 166/305 R |
| 3,642,506 | 2/1972 | Johnson | 106/90 |
| 3,711,405 | 1/1973 | Pye et al. | 252/8.55 |
| 3,722,591 | 3/1973 | Maxson | 166/295 |
| 3,782,983 | 1/1974 | Komor | 106/88 |
| 3,818,998 | 6/1974 | Hessert | 175/72 |
| 3,821,985 | 7/1974 | George | 166/293 |
| 3,884,351 | 10/1974 | Sutton et al. | 166/293 |
| 3,887,009 | 6/1975 | Miller et al. | 166/292 |
| 3,921,717 | 11/1975 | Danjushevsky et al. | 166/292 |
| 3,926,257 | 12/1975 | Marrast et al. | 166/293 |
| 3,955,993 | 5/1976 | Curtice et al. | 106/662 |
| 3,979,217 | 9/1976 | Sutton | 106/675 |
| 3,990,903 | 11/1976 | Mallow | 106/84 |
| 4,057,528 | 11/1977 | Hunt | 260/29.7 S |
| 4,126,009 | 11/1978 | Tomic | 106/90 |
| 4,200,153 | 4/1980 | Gallus | 166/292 |
| 4,252,193 | 2/1981 | Powers et al. | 166/292 |
| 4,258,790 | 3/1981 | Hale | 166/293 |

(List continued on next page.)

FOREIGN PATENT DOCUMENTS

| | | |
|---|---|---|
| 747213 | 11/1966 | Canada ............... 166/16 |
| 1003640 | 2/1957 | Fed. Rep. of Germany . |
| 2050084 | 4/1972 | Fed. Rep. of Germany . |
| 50150-724 | 5/1974 | Japan . |
| 51000-525 | 6/1976 | Japan . |
| 960420A | 9/1982 | U.S.S.R. . |
| 1125226A | 11/1984 | U.S.S.R. . |
| 1193268A | 11/1985 | U.S.S.R. . |
| 1213177A | 2/1986 | U.S.S.R. . |
| 1239270A | 6/1986 | U.S.S.R. . |
| 787187 | 12/1957 | United Kingdom . |
| 819229 | 9/1959 | United Kingdom . |

Primary Examiner—Mark L. Bell
Assistant Examiner—Paul Marcontoni

[57]  ABSTRACT

A surfactant is added to a cement containing a polymer fluid loss additive, to synergistically reduce fluid loss from the cement before it hardens.

2 Claims, No Drawings

U.S. PATENT DOCUMENTS

| | | | |
|---|---|---|---|
| 4,299,516 | 11/1981 | Miyoshi et al. | 405/266 |
| 4,304,298 | 12/1981 | Sutton | 166/293 |
| 4,328,036 | 5/1982 | Nelson et al. | 106/85 |
| 4,391,329 | 7/1983 | Gallus | 166/336 |
| 4,433,731 | 2/1984 | Chatterji et al. | 166/293 |
| 4,461,856 | 7/1984 | Willis et al. | 523/401 |
| 4,519,452 | 5/1985 | Tsao et al. | 166/288 |
| 4,547,223 | 10/1985 | Goto et al. | 106/90 |
| 4,569,395 | 2/1986 | Carpenter | 166/293 |
| 4,584,327 | 4/1986 | Sutton | 523/130 |
| 4,666,517 | 5/1987 | Bakar | 106/35 |
| 4,674,572 | 6/1987 | Gallus | 166/285 |
| 4,676,832 | 6/1987 | Childs et al. | 106/90 |
| 4,687,516 | 8/1987 | Burkhaher et al. | 166/293 |
| 4,716,965 | 1/1988 | Bol et al. | 166/292 |
| 4,742,094 | 5/1988 | Brothers et al. | 523/130 |
| 4,746,365 | 5/1988 | Babcock et al. | 106/695 |
| 4,767,460 | 8/1988 | Parcevaux et al. | 106/90 |

CEMENT FLUID LOSS REDUCTION

This is a continuation of Ser. No. 614,048, filed Nov. 9, 1990, now abandoned, which is a continuation of application Ser. No. 363,233, filed Jun. 8, 1989, now abandoned.

BACKGROUND OF THE INVENTION

1. Field of the Invention

The present invention pertains to new and useful improvements in reducing the fluid loss of cement slurries. Cement formulations of the invention also exhibit improved interfacial sealing between the hardened cement and pipe or borehole wall.

2. Description of Prior Art

Subsequent to drilling a borehole of an oil or gas well, casing is run into the well and a cement slurry is placed in the annulus between the outside of the casing and the borehole wall. Typically, the cement slurry is placed in the annulus using a successive fluid displacement technique. In this technique, the cement is first pumped into the casing. Another fluid often drilling fluid or water is pumped behind the cement to displace it out the bottom of the casing and up into the annulus between the casing and borehole wall. The cement slurry is usually raised to a point above the uppermost section of the formations to be isolated and may be raised into the annulus between the casing string being cemented and a previously cemented casing.

Differential pressure is required to place the cement in the annulus. A differential pressure typically exists between the fluid column in the annulus and the pore pressures of the exposed formations. The hydrostatic pressure in the annulus immediately after the cement is placed is usually higher than the pore pressure of exposed formations in order to prevent flow of formation fluids into the annulus.

Since cement slurries are suspensions of solids in water and the exposed formations of the wellbore are permeable, filtration can occur. In this case, fluid from the cement slurry can be lost to the exposed permeable formations through filtration resulting from the pressure differential between the annulus and formations. To prevent this, fluid loss control agents are added to the cement slurry. Typically, these fluid loss agents are polymeric materials. A considerable variety of polymer classes exist which will function to reduce the fluid loss of cement and others are being developed.

Many types of polymeric fluid loss control agents increase the viscosity of the cement slurry. Surface active agents such as naphthalene sulfonate formaldehyde condensates, phenol sulfonate formaldehyde condensates, and lignosulfonates are commonly added to cement slurries to disperse the cement particles and fluid loss additive, and reduce the slurry viscosity. In many cases, the dispersing and viscosity reducing surface active agent was preblended into the fluid loss additive mixture. Examples of this art are contained in U.S. Pat. Nos. 3,132,693, 4,258,790, 4,433,731, 4,687,516, 4,569,395, and 4,742,094.

Some of the surfactants of the type used in the present invention have been employed in the preparation of liquid fluid loss additives which may be added to the cement slurry (U.S. Pat. No. 4,687,516). Such surfactants are used for a different purpose than in the present invention, namely to water wet a polymer upon contact with water in the preparation of the cement slurry. An organic dispersing agent of the type previously described is also present in this prior art.

It will be shown by data presented in the detailed description of the present invention hereinafter that a certain type of surfactant alone can reduce the fluid loss of the cement slurry by interacting with the polymer fluid loss agent in the slurry.

SUMMARY OF THE INVENTION

The purpose of the present invention is to reduce the fluid loss of a cement slurry by using certain types of surfactants which interact with a polymeric fluid loss control agent and disperse the cement in the slurry. The interaction between the polymer and surfactant is advantageous to the formulation of cement slurries which provide better interfacial sealing between the cement and pipe and borehole wall upon hardening.

Accordingly, the present invention provides an additive for preparation of an aqueous oil field cement slurry comprising a water soluble polymer functional to reduce fluid loss of the slurry, said polymer being present in the aqueous phase of the slurry in an amount in the range of from about 0.1% to 5% by weight of the hydraulic cement of the slurry, and a surfactant functional both to interact with said polymer to reduce fluid loss of the slurry and to disperse the cement in the slurry, said surfactant being present in the aqueous phase of the slurry in an amount in the range of from about 0.05% to 5% by volume of the aqueous phase of the slurry.

In addition, the present invention provides a method for preparing an aqueous oil field cement slurry comprising selecting a water soluble polymer functional to reduce fluid loss of the cement slurry, selecting a surfactant functional both to interact with the polymer to reduce fluid loss of the cement slurry and to disperse the cement in the slurry, and blending the polymer, surfactant, water and cement to form the cement slurry.

Other purposes, distinctions over the art, advantages and features of the invention will become apparent to one skilled in the art upon review of the following.

DESCRIPTION OF PREFERRED EMBODIMENTS

Applicant has discovered that certain types of surfactants and polymers interact in such a manner that the fluid loss of a cement slurry can be reduced. The chemical composition of the surfactant which will provide a reduction in fluid loss depends upon the type (or types) of polymeric materials added to the cement slurry as the primary fluid loss control agent. The chemical and physical mechanisms causing this improvement have not been fully established. However, the physical testing data shows that these favorable interactions occur between certain polymer groups and certain surfactant classes. The surfactant may also act to disperse the cement slurry thereby reducing viscosity and eliminating the need for other dispersing agents such as sodium salts of naphthalene sulfonate formaldehyde condensated or sodium salts of phenol sulfonate formaldehyde condensates.

The fluid loss control polymers may be cellulose derivatives, polyvinyl alcohols, polyvinyl alcohol/acetate derivatives, or vinyl sulfonate/vinyl amide polymers. Derivatives of cellulose such as, but not limited to, hydroxyethyl cellulose, carboxymethyl cellulose, and carboxymethyl hydroxyethyl cellulose are among the most common additives which control fluid loss.

Other polymers such as polyvinyl alcohol/polyvinyl acetate, vinyl sulfonate/vinyl amide, polyethyleneimine, reaction products of polyethyleneimine and sulfonated organic compounds (U.S. Pat. No. 4,742,094), hydrolyzed copolymers of acrylamide and 2-acrylamido, 2-methyl propane sulfonic acid (U.S. Pat. No. 4,015,991) and polyvinyl pyrrilodone are other examples of the types of materials used to reduce the filtration loss of cement slurries. The concentration of polymer in the water phase used to prepare the slurry will generally be from about 0.1% to 5% by weight of the hydraulic cement of the slurry.

The surfactants of the invention may be anionic, amphoteric, cationic, nonionic or blends of nonionics with anionic or cationic surfactants. The concentration of surfactant in the water phase used to prepare the slurry will generally be from 0.05 to 5% by volume and more preferably between 0.1 and 3% by volume. Excellent results have been obtained with concentrations between 1.17 and 2.33% by volume.

Certain combinations of surfactants and fluid loss control agents work particularly well together. Why this happens is not understood at this time. These combinations are as follows: (A) carboxymethyl hydroxyethyl cellulose and any one of a sodium salt of sulfated nonylphenoxy poly(ethyleneoxy) ethanol, sodium lauryl sulfate, triethanolamine lauryl sulfate, polyoxypropylene methyl ethyl ammonium acetate, polypropoxy quaternary ammonium phosphate, ethoxylated nonylphenol with about 10 moles ethylene oxide, a blend of $C_4$-$C_8$ fluoroaliphatic adducts, coco amidopropyl betaine, a $C_{12}$-$C_{13}$ linear alcohol ethoxylate with about 3 moles ethylene oxide, a $C_{12}$-$C_{13}$ linear alcohol ethoxylate sulfate with about 3 moles ethylene oxide, a $C_{12}$-$C_{15}$ linear alcohol ethoxylate sulfate with about 3 moles ethylene oxide, a $C_{14}$-$C_{15}$ linear alcohol ethoxylate sulfate with about 2.5 moles ethyleneoxide, a sodium salt of alkyl aryl polyether sulfonate, cocoamidopropyl hydroxysultaine, polyoxyethylene sorbitan monooleate, coco betaine, a $C_9$-$C_{11}$ linear alcohol ethoxylate with about 2.5 moles ethylene oxide; (B) polyvinyl alcohol/polyvinyl acetate and any one of sodium decyl sulfate, sodium tzidecyl sulfate, sodium lauryl sulfate, a $C_{12}$-$C_{13}$ linear alcohol ethoxylate sulfate with about 3 moles ethylene oxide, a $C_{12}$-$C_{15}$ linear alcohol ethoxylate sulfate with about 3 moles ethylene oxide, a $C_{14}$-$C_{15}$ linear alcohol ethoxylate sulfate with about 2.5 moles ethylene oxide, a sodium salt of alkyl aryl polyether sulfonate, cocoamidopropyl hydroxysultaine, polyoxyethylene sorbitan monooleate.

Surfactants of the invention differ from prior ar surface active agents which disperse the cement particles and interact with fluid los control agents to reduce fluid loss in one or more of the following ways. First, the surface active agents of the invention are effective surface tension reducers. Prior art surface active agents, such as sodium salts of naphthalene sulfonate formaldehyde condensated or sodium salts of phenol sulfonate formaldehyde condensates do not reduce the surface tension of the aqueous phase of the slurry as much as the agents of the present invention. Examples of this are provided in Table 1. The surfactant reduces surface tension of the aqueous phase of the slurry from about 20 to 55 dynes/centimeter. Second, the prior art surface active agents such as sodium salts of naphthalene sulfonate formaldehyde condensated or sodium salts of phenol sulfonate formaldehyde condensates are polymeric materials having molecular weights typcially around 5000. The surfactants of the present invention generally have molecular weights of less than 2000 and typically less than 1000. Third, the surfactants of the invention contribute to improved interfacial sealing between the hardened cement and the pipe or borehole wall. Fourth, the chemical composition of the surfactants of the invention is different from the prior art.

The surfactants or mixtures of surfactants should be soluble in the cement slurry and not precipitate or otherwise degrade under the action of the ions in the cement slurry and the temperature and pressure conditions occurring during the placement and curing of the cement.

Some surfactants may be solids—either powders or waxes or some surfactants may be pastes or highly viscous solutions. In these cases, a solution of the surfactant may be prepared for addition to or injection into the cement slurry. Water and/or low molecular weight alcohols (monohydric or diols) such as methanol, ethanol, n-propanol, isopropanol, ethylene glycol, or propylene glycol may be used to prepare the solution containing the surfactant for addition to the cement slurry. Powders may also be dry blended with the cement powder although an antifoam agent may be required in the mix water to allow the slurry to be prepared in the customary mixing equipment for oil and gas well cement slurries.

Some combinations of surfactants of the present invention and polymeric fluid loss control agents in a cement slurry do not reduce the fluid loss of the slurry to a value as low as the fluid loss achieved with prior art surface active agents such as the sodium salt of naphthalene sulfonate condensed with formaldehyde or the similar prior art agents mentioned above. However, the better interfacial sealing produced by the present invention more than offsets any lesser achievement of fluid loss control by such combinations.

The term "hydraulic cement" is meant to encompass any inorganic cement which hardens or sets under water. Hydraulic cements, for example, include Portland cement, aluminous and pozzolan cement, blast furnace slag cement, and the like. The term is also intended to include cements having extenders such as bentonite, silicates, gilsonite, perlite, pozzolan or glass microspheres, ground coal or silica fume. The term also includes cements used either without any appreciable sand or aggregate material or such cements mixed with granular filling material, such as sand, ground limestone, crushed firebrick and the like. Mixtures of Portland cement and lightweight cement (also referred to as talc cement) or blast furnace slag cement are effective within the scope of the invention.

While various hydraulic cements can be utilized in forming the slurries, Portland cements of the various types identified as API Class A through H and J cements are commonly utilized. These cements are identified and defined in "API Specification for Materials and Testing for Well Cements", API SPEC 10, Third Edition, Jul. 1, 1986, of the American Petroleum Institute.

Various additives conventionally added to cement compositions useful in cementing casings in a borehole of a well can also be added to the novel cement compositions herein in the amounts normally used. These additives can include, for example, cement accelerators such as calcium chloride, sodium chloride, gypsum, sodium silicate and seawater; light-weight additives such as bentonite, diatomaceous earth, gilsonite, coal, perlite, and pozzolan; heavy weight additives such as hematite, ilmenite, barite, silica flour, silica sand; cement retarders such as lignins, gluconic acid, sodium borate, boric acid, citric acid, and lignosulfonates. In addition, other unconventional additives such as xanthan gum or guar gum or its derivatives can also be used.

A defoamer may be used with the invention. The defoamer is commonly employed in an amount from about 0.1 to 0.3% by weight of the cement and can be selected from any of the commercially available defoamers commonly used in cement slurries. Defoamers that are satisfactorily used in slurries include FOAM-MASTER®A and PD-1® by Diamond Shamrock Corp. and NALCO®3801 by Nalco Chemicals, Inc.

Where the cement is placed in an interval where the static temperature exceeds 230° F., it can also be desirable to include from about 20 to 50% silica sand or silica flour by weight of the cement, in the slurries of the invention to prevent strength retrogression. At static temperatures over about 230° F the strength of the cement will decrease over a period of time unless crystalline silica is added.

The mixing water for the slurry can be fresh water, brine or seawater. Mixing water is utilized with the dry cement composition to produce a fluid pumpable slurry. The amount of water used can vary over a wide range depending upon the consistency of the slurry, the density of the slurry required, the strength requirement for the particular job, and other factors.

Slurries in accordance with the invention can be formed through the use of conventional techniques and apparatus normally employed in well cementing operations. The surfactant may be added to the bulk cement slurry prepared in a holding tank on the surface according to a procedure commonly referred to as batch mixing. However, the surfactant may be injected continuously into the slurry as it is prepared and pumped into the well by the use of an injection pump. Both operations have been successfully performed in field applications without problems.

The cement of the present invention is injected into a selected "part" of the well. This "part" may be between casings, between a casing and a borehole, between a casing and a filter cake deposited on a borehole, etc. The cementing may be a "primary" cementing application or the repairing of a previous cementing application, e.g. "remedial" or "squeeze" cementing which can be conducted through perforations in the casing and fractures in the old cement, etc.

The following Tables demonstrate the invention and provide examples of combinations of surfactants and fluid loss control agents which interact synergistically to reduce the filtration loss of cement slurries.

TABLE 1

Surface Tension of Solutions Containing Surface Active Agents in Distilled Water at 25° C.

| Additive | Concentration % by weight | Surface Tension dynes/sq. cm |
|---|---|---|
| PRIOR ART | | |
| Naphthalene Sulfonate Formaldehyde Condensate (Sodium salt) | 0.5 | 73.2 |
| Naphthalene Sulfonate Formaldehyde Condensate (Sodium salt) | 1.0 | 71.7 |
| Phenol Sulfonate Formaldehyde Condensate | 0.5 | 71.7 |
| Phenol Sulfonate Formaldehyde Condensate | 1.0 | 70.2 |
| Blend of Calcium and Sodium | 0.1 | 71.0 |

TABLE 1-continued

Surface Tension of Solutions Containing Surface Active Agents in Distilled Water at 25° C.

| Additive | Concentration % by weight | Surface Tension dynes/sq. cm |
|---|---|---|
| Lignosulfonates | | |
| Blend of Calcium and Sodium Lignosulfonates | 0.25 | 68.3 |
| Blend of Calcium and Sodium Lignosulfonates | 0.5 | 60.9 |
| PRESENT INVENTION | | |
| Coco Amido Betaine | 0.2 | 33.4 |
| Coco Amido Betaine | 1.0 | 33.1 |
| Sodium lauryl sulfate | 0.2 | 25 |

TABLE 2

Comparison of API Fluid Loss @ 175° F.
1000 psi Differential Pressure
Filter Medium: 325 mesh Stainless Steel Screen
Cement Formulation: Class H Portland Cement + 0.6% (bwoc)
Carboxymethyl hydroxyethyl cellulose[1] + 40% (bwoc) Fresh Water

| Surfactant Description | Concentration | API Fluid Loss cc's/ 30 minutes | Interfacial Sealing Quality at Cement-Pipe Interface |
|---|---|---|---|
| Control, no surface active agents | | 89 | Very Poor |
| PRIOR ART | | | |
| Sodium salt of naphthalene sulfonate condensed with formaldehyde | 0.75% bwoc | | Very Poor |
| Sodium salt of phenol sulfonate condensed with formaldehyde | 0.75% bwoc | 40 | Very Poor |
| PRESENT INVENTION | | | |
| Sodium salt of sulfated nonylphenoxy poly(ethyleneoxy) ethanol (Aerosol NPES-458 ® by American Cyanamid Chemical Products Div.) | 2.33% bvow | 30 | Excellent |
| Sodium lauryl sulfate (AVIROL ® SL-2010 by Henkel Corp.) | 2.33% bvow | 44 | Excellent |
| Triethanolamine lauryl sulfate (CONCO TEA ® Sulfate by Continental Chemical Co.) | 2.33% bvow | 74 | Excellent |
| Polyoxypropylene methyl ethyl ammonium acetate (EMCOL ® C-55 by Witco Corp., Organics Division) | 2.33% bvow | 78 | Excellent |
| Polypropoxy quaternary ammonium phosphate (EMCO ® C-57 by Witco Corp., Organics Division) | 2.33% bvow | 66 | Excellent |
| Ethoxylated nonylphenol with 10 moles ethylene oxide (Dow POLYGLYCOL ® 34 by Dow Chemical Company) | 2.33% bvow | 62 | Excellent |
| Blend of $C_4$-$C_8$ fluoroaliphatic adducts | 2.33% bvow | 42 | Excellent |

TABLE 2-continued

Comparison of API Fluid Loss @ 175° F.
1000 psi Differential Pressure
Filter Medium: 325 mesh Stainless Steel Screen
Cement Formulation: Class H Portland Cement + 0.6% (bwoc)
Carboxymethyl hydroxyethyl cellulose[1] + 40% (bwoc)
Fresh Water

| Surfactant Description | Concentration | API Fluid Loss cc's/ 30 minutes | Interfacial Sealing Quality at Cement-Pipe Interface |
|---|---|---|---|
| (FLUORAD ® 170C by 3M Company, Industrial Chemicals Div.) Coco amidopropyl betaine (MONATERIC ® ADA by Mona Industries, Inc.) | 2.33% bvow | 66 | Excellent |
| $C_{12}$-$C_{13}$ linear alcohol ethoxylates with 3 moles ethylene oxide (NEODOL ® 23-3S by Shell Chemical Company) | 2.33% bvow | 68 | Excellent |
| $C_{12}$-$C_{13}$ linear alcohol ethoxylates with 3 moles ethylene oxide (NEODOL ® 23-3S by Shell Chemical Company) | 2.33% bvow | 38 | Excellent |
| $C_{12}$-$C_{15}$ linear alcohol ethoxylate sulfate with 3 moles ethylene oxide (NEODOL ® 25-3S by Shell Chemical Company) | 2.33% bvow | 25 | Excellent |
| $C_{14}$-$C_{15}$ linear alcohol ethoxylate sulfate with 2.5 moles ethylene oxide (NEODOL ® 45-2.5S by Shell Chemical Company) | 2.33% bvow | 45 | Excellent |
| Sodium salt of alkyl aryl polyether sulfonate (TRITON ® X-200 by Rohm and Haas Company) | 2.33% bvow | 52 | Excellent |
| Cocoamidopropyl hydroxysultaine (VARION ® CAS by Sherex Chemical Company, Inc.) | 2.33% bvow | 74 | Excellent |
| Poloxethylene (20) sorbitan monooleate (TWEEN ® 80 by ICI Americas, Inc.) | 2.33% bvow | 50 | Excellent |
| Coco betaine (VELVETEX ® Coco Betaine by Henkel Corp.) | 2.33% bvow | 80 | Excellent |
| $C_9$-$C_{11}$ linear alcohol ethoxylate with 2.5 moles ethylene oxide (NEODOL ® 91-2.5 by Shell Chemical Company) | 2.33% bvow | 72 | Excellent |

[1]Product tested was Diacel LWL by Drilling Specialties Co., Bartlesville, Oklahoma
*bwoc = by weight of cement
**bvow = by volume of mix water solution

TABLE 3

Comparison of API Fluid Loss @ 175° F.
1000 psi Differential Pressure
Filter Medium: 325 mesh Stainless Steel Screen
Cement Formulation: Class H Portland Cement + 1.0% (bwoc)
Polyvinyl alcohol/polyvinyl acetate[1] + 40% (bwoc) Fresh Water

| Surfactant Description | Concentration | API Fluid Loss cc's/ 30 minutes | Interfacial Sealing Quality at Cement-Pipe Interface |
|---|---|---|---|
| Control, no surface active agents | | 635 | Very Poor |
| PRIOR ART | | | |
| Sodium salt of naphthalene sulfonate condensed with formaldehyde | 0.75% bwoc | 20 | Poor |
| Sodium salt of phenol sulfonate condensed with formaldehyde | 0.75% bwoc | 22 | Poor |
| PRESENT INVENTION | | | |
| Sodium decyl sulfate (AVIROL ® SA-4110 by Henkel Corp.) | 2.33% bvow | 100 | Excellent |
| Sodium tridecyl sulfate (AVIROL ® SA-4113 by Henkel Corp.) | 2.33% bvow | 40 | Excellent |
| Sodium lauryl sulfate AVIROL ® SL-2010 by Henkel Corp.) | 2.33% bvow | 38 | Excellent |
| Cocoamidopropyl betaine (MONATERIC ® CAB by Mona Industries, Inc.) | 2.33% bvow | 34 | Excellent |
| $C_{12}$-$C_{13}$ linear alcohol ethyoxylate sulfate with 3 moles ethylene oxide (NEODOL ® 23-3S by Shell Chemical Company) | 2.33% bvow | 60 | Excellent |
| $C_{12}$-$C_{15}$ linear alcohol ethoxylate sulfate with 3 moles ethylene oxide (NEODOL ® 25-3S by Shell Chemical Company) | 2.33% bvow | 20 | Excellent |
| $C_{14}$-$C_{15}$ linear alcohol ethoxylate sulfate with 2.5 moles ethylene oxide (NEODOL ® 45-2.5S by Shell Chemical Company) | 2.33% bvow | 96 | Excellent |
| Sodium salt of alkyl aryl polyether sulfonate (TRITON ® X-200 by Rohm and Haas Co.) | 2.33% bvow | 46 | Excellent |
| Cocoamidopropyl hydroxysultaine (VARION ® CAS by Sherex Chemical Company, Inc.) | 2.33% bvow | 64 | Excellent |
| Poloxethylene (20) sorbitan monooleate (TWEEN 80 by ICI Americas Inc.) | 2.33% bvow | 68 | Excellent |

[1]Product tested was Halliburton's LAP-1
*bwoc = by weight of cement
**bvow = by volume of mix water solution The foregoing description of the invention is merely intended to be explanatory thereof, and various changes in the details of the described processes and compositions may be made within the scope of the appended claims without departing from the spirit of the invention.

What is claimed is:

1. A method for preparing an aqueous oil field cement slurry for injection between a borehole and a pipe within the borehole, comprising:

preparing an effective amount of polyvinyl alcohol/-polyvinyl acetate functional to reduce fluid loss of the cement slurry;

preparing an effective amount of a surfactant functional 1) to interact with said polymer to reduce fluid loss of the cement slurry, 2) to disperse the cement in the slurry, and 3) to improve interfacial sealing between the cement and at least one of a) the pipe, and b) the borehole, said surfactant reducing the surface tension of the aqueous phase of the slurry by from about 20 to 55 dynes/centimeter, said surfactant being selected from the group consisting of sodium decyl sulfate, sodium tridecyl sulfate, sodium lauryl sulfate a $C_{12}$-$C_{13}$ linear alcohol ethoxylate with about 3 moles ethylene oxide, a $C_{12}$-$C_{15}$ linear alcohol ethoxylate sulfate with about 3 moles ethylene oxide, a $C_{14}$-$C_{15}$ linear alcohol ethoxylate sulfate with about 2.5 moles ethylene oxide, a sodium salt of alkyl aryl polyether sulfonate, cocoamidopropyl hydroxysultaine, polyoxyethylene sorbitan monooleate; and blending the polymer, surfactant, water and cement to form the cement slurry.

2. The method of claim 1 wherein the slurry is substantially free of naphthalene sulfonate formaldehyde, condensate, phenol sulfonate formaldehyde condensate, calcium and sodium lignosulfonate blends, sodium salt of naphthalene sulfonate condensed with formaldehyde and sodium salt of phenol sulfonate condensed with formaldehyde.

* * * * *